W. W. GRISCOM.
Electro-Magnetic Motor.
No. 227,622.  Patented May 18, 1880.
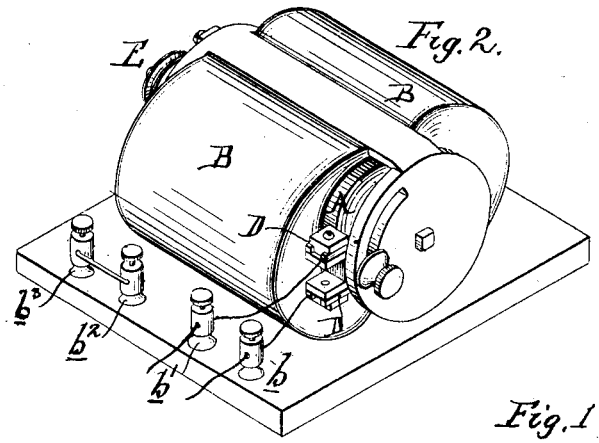
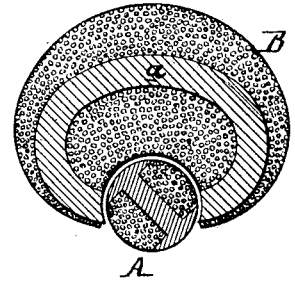
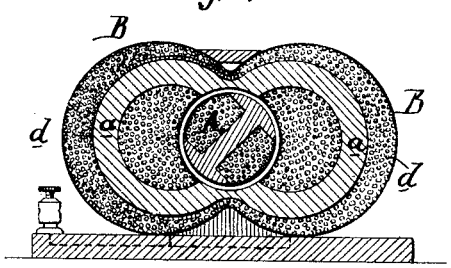
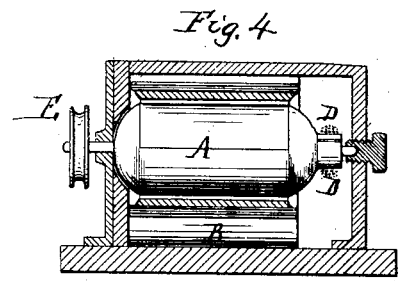
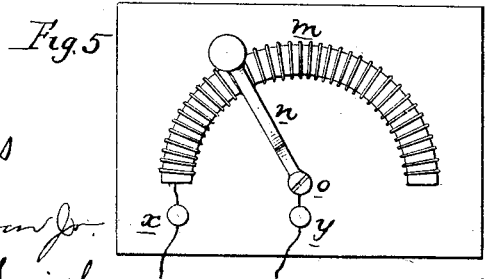
Witnesses
Henry Howson Jr.
Harry Smith
Inventor
William W. Griscom
by his Attorneys
Howson & Son

UNITED STATES PATENT OFFICE.

WILLIAM W. GRISCOM, OF PHILADELPHIA, PENNSYLVANIA.

ELECTRO-MAGNETIC MOTOR.

SPECIFICATION forming part of Letters Patent No. 227,622, dated May 18, 1880.

Application filed October 21, 1879.

*To all whom it may concern:*

Be it known that I, WILLIAM W. GRISCOM, a citizen of the United States, and a resident of Philadelphia, Pennsylvania, have invented certain Improvements in Electro-Magnetic Motors or Dynamo-Electric Machines, of which the following is a specification.

The main object of my invention is so to construct an electro-magnetic motor or dynamo-electric machine that the maximum effective power may be produced with as little loss as possible. This object is attained in the manner hereinafter described, reference being had to the accompanying drawings, in which—

Figure 1 is a diagram illustrative of the invention; Fig. 2, a perspective view of the improved motor or dynamo-electric machine; Fig. 3, a transverse section; Fig. 4, a longitudinal section, and Fig. 5 a view of the regulator for the motor.

The main feature of the invention relates to the construction of the electro-magnets, and will be best understood by reference to the diagram, Fig. 1, in which A represents the revolving armature. This armature may be a magnetic armature of any ordinary construction, and in the drawings is shown one of the well-known Siemens armatures, consisting of a bar having two opposite longitudinal grooves, in which are wound the coils of wire, the two ends of the latter being connected to the commutator on the end of the bar. The bar of the armature may, if desired, be formed of a plain bar without the usual polar extensions.

The core $a$ of the magnet B, as illustrated in Fig. 1, is made of a form which may be said to represent a tube, the continuity of which is interrupted by a longitudinal slot extending from end to end of the tube, and in this slot a rotating armature, A, is so arranged that while the poles of the magnet are on opposite sides of the armature, in line with its axis, the entire body of the magnet and its poles shall closely envelop or surround a portion of the rotary armature in the direction of rotation, as shown in the drawings, the object being to so construct the magnet that all its parts will be as near as practicable to the armature, so that all parts of the magnet will exert their maximum effect.

For practical purposes it is preferable to construct the motor or machine with a double magnet, as shown in Figs. 2, 3, and 4, A being the above-mentioned rotary armature, and B B the electro-magnets, D D the brushes of the commutator, and E the pulley for transmitting the power.

The core of each magnet is made of the form described above with reference to Fig. 1—that is to say, each magnet must be of such a form as to practically embrace the armature in the direction of rotation, so that while the opposite poles or polar extensions of each magnet shall be on opposite sides of the armature, in line with its axis, the entire inner surface of the wire covering of the magnet, with its polar pieces, will closely envelop a portion of the armature, while at the same time permitting free rotation of the latter within the magnets and its poles.

The adjoining poles or polar extensions of the two magnets may be contiguous, or they may be made in one piece, as illustrated in Fig. 3, so that the polar extensions thereby become common to both magnets, it being understood that, so far as each magnet is individually considered, its poles, practically speaking, extend over the entire surface of iron exposed to the armature, the opposite poles of each magnet being in line with the axis of the armature.

Around the cores of the two magnets are wound the wire or wires $d\ d$, the ends of which may be connected to binding-posts or a switch, by which they may be made to form circuits in connection with the armature and battery-wires, in the usual ways.

In the drawings the two battery-wires are connected to binding-posts $b\ b'$, to which the wires of the commutator are also connected, the commutator in this case being arranged to reverse the currents as the armature revolves. The wires of the field-magnets are connected to binding-posts $b^2$ and $b^3$, Figs. 2 and 3. If, now, the connections are so made that the current passes only through the brushes to the armature—that is, when the binding-posts $b^2$ and $b^3$ have no connection with armature or battery—the external magnets thus not being in circuit, and the ends of their wires being unconnected with each other, the motor will nevertheless revolve with considerable rapidity; but if the ends of the wires of the coils of the field-magnets are electrically connected with one another—that is, when the two binding-posts $b^2$ and $b^3$ are connected, as shown in Fig. 2—powerful induced currents will pass through the coils as the armature revolves, and will highly magnetize the cores of the field-magnets, and thereby increase the power of the motor.

It will be evident that a motor having one or a pair of permanent magnets may be made on the plan described—that is to say, constructing each magnet so that while the poles are on opposite sides of the armature, in line with its axis, the entire body of the magnet and its poles closely surround the armature, which revolves within the magnet or magnets and polar pieces.

By constructing the motor so that the two field-magnets with their poles completely surround the armature, an uninterrupted field of magnetized iron is obtained around the armature, which, in connection with its coils, presents a complete magnetic cylinder.

In order to obtain a delicate regulation of the power of the motor a resistance-coil is combined therewith. This regulator I construct as shown in Fig. 5. The regulator may be arranged at any suitable point in the circuit, the circuit-connection being made through the binding-post $x$, coil of wire $m$, wrapped around a curved non-conducting strip through the arm or lever $n$, pivoted at $o$, and through the binding-post $y$. The outer end of the contact-arm $n$ rests on the wire, and by moving this arm on its pivot to the right or left, so as to include more or less of the wire in the circuit, the strength of the current may be varied and the speed of the motor evenly and delicately regulated.

Electric motors have heretofore been provided with regulators, and I therefore do not desire to claim this broadly.

I claim as my invention—

1. In an electro-magnetic motor or dynamo-electric machine, the combination of a rotary magnetic armature with a magnet or a pair of magnets, each having its opposite poles on opposite sides of the armature, in line with the axis of rotation, while the entire body of each magnet, in connection with its poles, closely envelops or surrounds a portion of the armature in the direction of its rotation, all substantially in the manner described.

2. An electro-magnetic motor or dynamo-electric machine in which a rotary armature presenting, in connection with its coils, a complete magnetic cylinder is combined with a pair of electro-magnets presenting, in connection with their coils, an uninterrupted field of magnetized iron around the armature.

3. An electro-magnetic motor or dynamo-electric machine in which a rotary electro-magnetic armature is combined with field-magnets having the ends of their wires electrically connected to each other for the purpose of utilizing the induced currents, as set forth.

4. The combination, with an electro-magnetic motor, of a regulator consisting of a curved strip with a coil of wire, $m$, pivoted contact-arm $n$, and binding-posts, all substantially as described.

In testimony whereof I have signed my name to this specification in the presence of two subscribing witnesses.

WM. W. GRISCOM.

Witnesses:
ALEXANDER PATTERSON,
HARRY SMITH.